United States Patent [19]

Yoshikawa et al.

[11] Patent Number: 5,769,953
[45] Date of Patent: Jun. 23, 1998

[54] PLASMA AND HEATING METHOD OF CLEANING VULCANIZING MOLD FOR ASHING RESIDUE

[75] Inventors: Masato Yoshikawa, Kodaira; Yukihiro Kusano, Kokubunji; Kazuo Naito, Kawasaki, all of Japan

[73] Assignee: Bridgestone Corporation, Tokyo, Japan

[21] Appl. No.: 637,376

[22] Filed: Apr. 25, 1996

[30] Foreign Application Priority Data

May 1, 1995 [JP] Japan .................................. 7-107517
May 2, 1995 [JP] Japan .................................. 7-108439

[51] Int. Cl.$^6$ ............................................. B08B 7/00
[52] U.S. Cl. ..................... 134/1.1; 264/402; 264/483
[58] Field of Search ................. 134/1.1, 1; 264/402, 264/483, 489, 39; 216/6, 7; 156/345 P

[56] References Cited

U.S. PATENT DOCUMENTS

| | | | |
|---|---|---|---|
| 4,534,921 | 8/1985 | Fierkens et al. ........................... | 264/39 |
| 4,818,326 | 4/1989 | Liu et al. ................................. | 156/345 |
| 5,002,632 | 3/1991 | Loewenstein et al. ............... | 156/643.1 |
| 5,312,519 | 5/1994 | Sakai et al. ................................ | 134/1 |
| 5,356,478 | 10/1994 | Chen et al. ................................ | 134/1 |
| 5,529,636 | 6/1996 | Nohara et al. ........................... | 134/1.1 |

FOREIGN PATENT DOCUMENTS 0 618 017 A1  10/1994  European Pat. Off. .
2 108 533   5/1983  United Kingdom .

OTHER PUBLICATIONS

Patent Abstracts of Japan, vol. 018, No. 545, Oct. 18, 1994, JP-A-06 196410.
Patent Abstracts of Japan, vol. 010, No. 121 May 7, 1986, JP-A-60 254730.
Patent Abstracts of Japan, vol. 016, No. 037 Jan. 29, 1992, JP-A-03 245526.

*Primary Examiner*—Jan Ludlow
*Assistant Examiner*—Saeed T. Chaudhry
*Attorney, Agent, or Firm*—Sughrue, Mion, Zinn, Macpeak & Seas, PLLC

[57] ABSTRACT

A method of cleaning a vulcanizing mold including the steps of providing, independently from a vacuum processing bath, a furnace for generating a plasma flow mainly containing neutral active species by a microwave discharge applied for a reactive gas; introducing the plasma flow in the processing bath and jetting it to the entire residue adhering surface of the mold positioned in the processing bath; and ashing residues by the jetted plasma gas. With this method, uniform ashing can be performed for residues adhering on the surface of a vulcanizing mold, without any adverse effect exerted on the mold.

2 Claims, 5 Drawing Sheets

PLASMA AND HEATING METHOD OF CLEANING VULCANIZING MOLD FOR ASHING RESIDUE

BACKGROUND OF THE INVENTION

The present invention relates to a method of cleaning a vulcanizing mold used for vulcanizing molding of rubber products such as a rubber tire and vibration-proof rubber and other elastomer products. It is advantageous to remove elastomer residues inevitably adhering on the molding inner surface (including the mating surface for a split mold) and in recesses and holes of the mold when repeatedly used. In particular, the present invention concerns a method of cleaning a vulcanizing mold, which is capable of stably, uniformly and efficiently processing elastomer residues, without deterioration and damage of the mold, and also without suffering from formation of an uneven plasma distribution region.

As described in detail in Japanese Patent Laid-open No. Hei 6-285868 filed by the present applicant, elastomer products, especially, a rubber tire product (hereinafter, referred to simply as "tire") and a vibration-proof product use as a raw material a natural rubber, synthetic rubber or a blend rubber thereof mixed with additives for satisfying various requirements. Such additives include sulfur as a crosslinking agent; carbon black as a reinforcing material; a vulcanizing accelerator; and chemicals for keeping various durabilities.

When such an unvulcanized rubber composition is subjected to vulcanizing molding, it is generally heated at a high temperature of about 200° C. for generating a chemical reaction such as crosslinking reaction. At this time, the rubber composition is not only increased in fluidity but also partially gasified. Consequently, the rubber composition and its reaction product inevitably strongly adhere as a trace amount of residue for each vulcanizing molding, on the surface portion of a vulcanizing mold. For example, it may exist on the molding surface, in a very narrow gap at the matting surface, and in a hole such as a so-called vent hole. The residue grows to such a thickness as not be negligible after repeated vulcanizing molding. The same is true for other elastomers.

The thick residues strongly adhering and growing on a vulcanizing mold will not only harm the appearance of a tire but also will exert an adverse effect on the excellent quality of the tire as a whole. For this reason, after being repeatedly used for vulcanizing molding by a specified number, a vulcanizing mold must be cleaned to a cleanliness factor comparable to that of a new mold. As a cleaning method, there have been known a shot-blasting method of blowing grains such as plastic beads or glass beads with the aid of a high pressure gas; and a liquid cleaning method of dipping the mold in an acid, alkali or amine based solution. These cleaning methods, however, have various disadvantages. To significantly improve these disadvantages, the present applicant has proposed a method of cleaning a vulcanizing mold by plasma in the above-described document, Japanese Patent Laid-open No. Hei 6-285868. This method has exhibited excellent effects.

However, after further examination of such effects of the above plasma cleaning method, the present applicant has found that there is still room for improvement in terms of the following disadvantageous points.

The first disadvantageous point is as follows. A plurality of projections such as ribs and sipes are formed on a mold formation surface of a vulcanizing mold in order to form wide grooves, narrow grooves, slits and the like in a tread portion for satisfying requirements for a general tire (excluding a special tire). Such projections of the mold shield a plasma flow during plasma cleaning, tending to harm uniformity in ashing throughout the entire area to be cleaned.

The present applicant has proposed a method and apparatus for improving uniformity in ashing in Japanese Patent Application Nos. Hei 7-19072, Hei 7-29158 and Hei 7-52480, wherein one electrode applied with a high frequency power, which is formed in a cylindrical shape having a plurality of fins around the outer periphery as required, is positioned at the center of a vulcanizing mold, and a plasma is generated by a discharge between such an electrode and the inner peripheral surface of the vulcanizing mold as the other electrode.

In the above method and apparatus, the uneven ashing as the first disadvantageous point is improved; however, the arrangement of the vulcanizing mold in a discharge region fails to solve the following disadvantageous points. Namely, the second disadvantageous point is that an uneven discharge area, which is often formed, obstructs uniform ashing.

The third disadvantageous point is that the temperature of a vulcanizing mold is increased, for example, up to 200° C. or more due to the above uneven discharge. This harms the accuracy of the mold, and also deteriorates and damages the mold.

The fourth disadvantageous point, which is associated with the third point, is that the temperature control for a vulcanizing mold is difficult, and thereby the ashing processing takes a lot of time, thus significantly reducing the processing efficiency.

The fifth disadvantageous point is that even the surface required not to be cleaned is exposed to the discharge area, and thereby such a surface portion is possibly deteriorated or damaged.

SUMMARY OF THE INVENTION

Accordingly, an object of the present invention is to improve all of the above-described disadvantageous points, and to provide a method of cleaning a vulcanizing mold which is capable of efficiently and uniformly ashing a residue portion, without a limitation in shape and size of a mold formation surface of the mold, and without exerting any adverse effect on the mold.

To achieve the above object, according to a preferred mode of the present invention, there is provided a method of cleaning a vulcanizing mold including the steps of:

positioning a vulcanizing mold in a vacuum processing bath;

applying a plasma of a low pressure reactive gas to an elastomer residue formed on the inner surface of the mold resulting from repeated vulcanizing molding of elastomers; and ashing and removing the residue, the improvement including the steps of:

providing a plasma generating furnace for supplying a plasma flow into the vacuum processing bath, and a microwave generating apparatus for converting a reactive gas flowing in the plasma generating furnace into a plasma flow mainly containing neutral active species by a microwave discharge;

introducing the plasma flow having mainly containing neutral active species which is generated in the plasma generating furnace, into the vacuum processing bath by way of a conduit tube;

uniformly jetting the introduced plasma flow to the entire residue adhering peripheral surface of the vulcanizing mold, and (as required) at the same time uniformly heating and keeping the entire residue adhering peripheral surface at a specified high temperature; and ashing the elastomer residue by the neutral active species contained in the jetted plasma flow.

The ashing processing is preferably carried out in a state that the vulcanizing mold placed in the vacuum processing bath is heated and kept at a temperature in a range of from 100° to 180° C.

Preferably, a heating source is provided on the residue adhering surface side of the vulcanizing mold; the temperature of the residue adhering surface heated due to a radiant heat supplied from the heating source is detected, and a quantity of the radiant heat supplied from the heating source is controlled on the basis of the detected temperature.

The reactive gas is preferably either a single oxygen gas or a mixed gas of an oxygen gas as a main component and a halogenated gas.

With respect to the reactive gas, any of O, $O_2$ and $O_3$ can be used as the oxygen gas; and various gases containing F (fluorine), Cl (chlorine), Br (bromine) and I (iodine) can be used as the halogenated gas. The halogenated gas is not necessarily in a gas state but may be in a liquid state in a standard condition (25° C., 1 atm) because it may be supplied as a gas state to a vacuum processing bath. Concretely, freon, $NF_3$ and $SF_6$ are effective and $CF_4$ (tetrafluorocarbon) is more effective as the halogenated gas used in the present invention.

According to the present invention, a plasma generating furnace is provided independently from a vacuum processing bath, and a plasma flow of a reactive gas generated in the furnace is introduced into the processing bath and is uniformly jetted on the entire residue adhering surface of a vulcanizing mold, so that the ashing for residues due to neutral active species (radicals) in plasma can be performed without exposure of the mold to a discharge area. This makes it possible to exclude all of the adverse effects of discharge on the mold. Namely, since an uneven plasma area is not formed, uneven ashing due to the uneven plasma area can be eliminated. The method of the present invention also makes it possible to perfectly avoid inconveniences such as deterioration in the accuracy of the mold due to abnormally increased temperature of the mold, and deterioration in the material and damage throughout the entire surface of the mold.

The elimination of the adverse effects of the abnormal discharge on the mold also enables generation of a desirable high density plasma to such an extent as to increase the density of neutral active species in plasma for ashing an elastomer residue up to a value enough to make up for a loss generated when the plasma is supplied from the plasma generating furnace to the residue adhering surface. Uniform and efficient ashing can be thus performed by uniformly jetting the neutral active species at a high density to the entire residue adhering surface.

An ashing reaction rate can be increased, according to the present invention, by heating and keeping a vulcanizing mold in the processing bath at a temperature in a range of from 100° to 180° C., resulting in the increased ashing processing efficiency. In addition, the use of a reactive gas composed of a single oxygen gas or a mixed gas of an oxygen gas as a main component and a halogenated gas contributes to further improvement in ashing processing efficiency.

The reaction rate of the ashing using neutral active species can be also significantly enhanced by uniformly heating and keeping the entire residue adhering surface of a vulcanizing mold at a high temperature, as a result of which the processing efficiency can be significantly enhanced. In this case, since the outer surface of the mold is low in temperature, a temperature gradient is generated between the inner surface (residue adhering surface) and the outer surface of the mold. As a result, even when the residue adhering surface of the mold is heated at a temperature conventionally considered to cause an inconvenience in the vulcanizing mold, for example, about 200° C., there is no inconvenience because the high temperature position is limited to the residue adhering surface, that is, the inner surface of the mold.

Incidentally, the mold must be cooled to about 50° C. prior to water washing of an ash content after ashing, in order to prevent fine deformation of the mold by water cooling. In this regard, the mold having the above temperature gradient between the inner and outer surfaces allows the cooling time to be significantly reduced, so that the processes from start of ashing to water washing can be carried out at a high efficiency.

The use of a reactive gas composed of a single oxygen gas or a mixed gas of an oxygen gas as a main component and a halogenated gas contributes to the further improvement in ashing processing efficiency because oxygen (O, $O_2$, $O_3$) radicals are particularly effective for ashing for elastomer residues.

BRIEF DESCRIPTION OF THE DRAWINGS

The present invention will be more particularly described with reference to the accompanying drawings, in which.

DETAILED DESCRIPTION OF THE PREFERRED EMBODIMENT

Hereinafter, one method of the present invention will be described in detail with reference to FIGS. 1 and 2.

Figure 1:
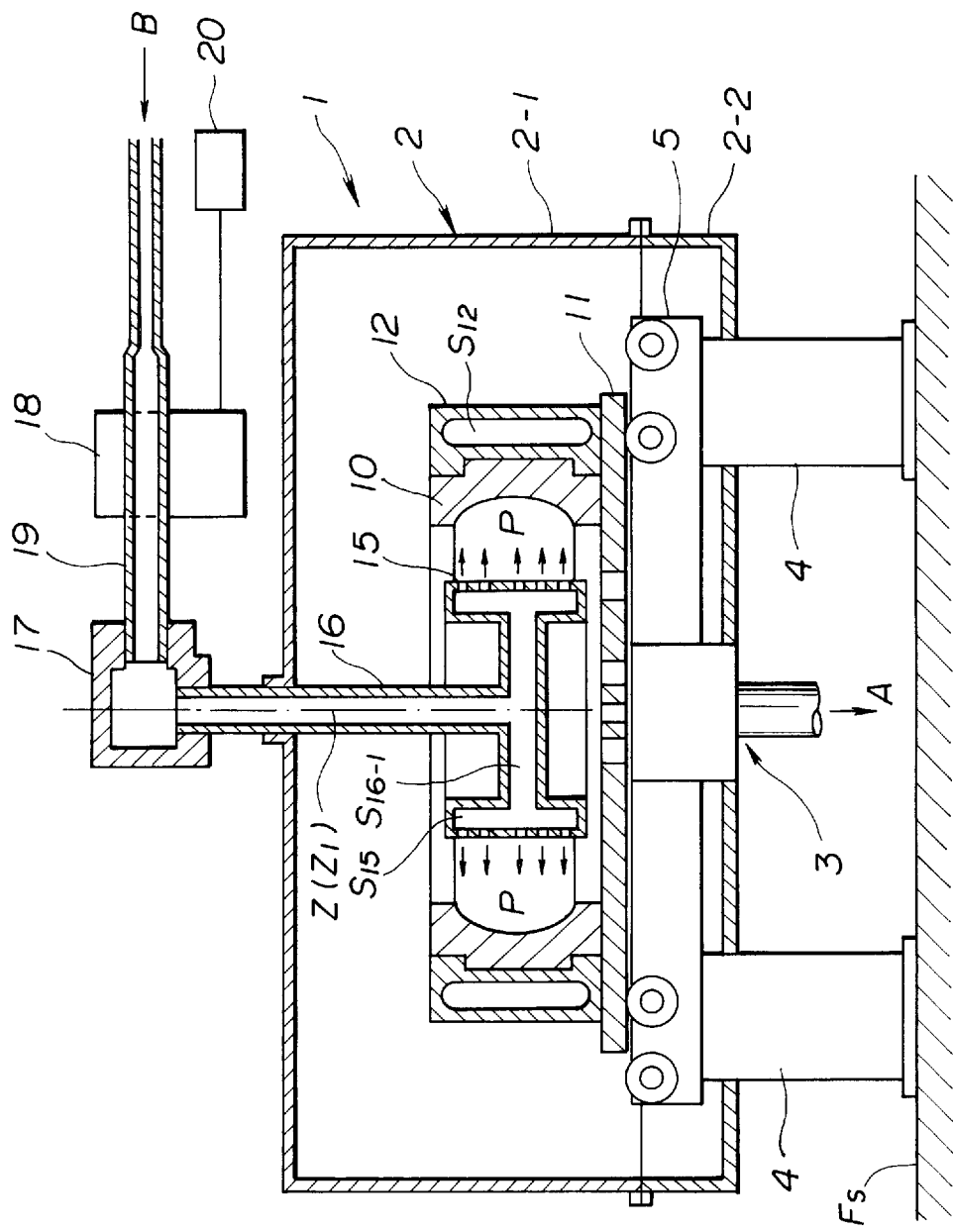
FIG. 1 is a sectional side view of one embodiment of the present invention, showing essential portions of a vacuum processing bath and a vulcanizing mold, with a plasma generating furnace schematically illustrated.

FIG. 1 is a sectional side view of essential portions of a vacuum processing bath 1 and a vulcanizing mold (hereinafter, referred to simply as "mold") 10, with a microwave generating unit and a microwave generating source schematically illustrated. FIG. 2 is a perspective view of a plasma shower pipe 15 shown in FIG. 1.

Referring to FIG. 1, the vacuum processing bath 1 has a vessel 2 including a vessel upper portion 2-1 and a vessel lower portion 2-2 which are vertically separable at a lower position and can be sealed. The vessel upper portion 2-1 is vertically removably mounted on the vessel lower portion 2-2. The vessel lower portion 2-2 includes a suction portion 3 connected to a vacuum pump (not shown). The vacuum pump is operated prior to start of cleaning of the vulcanizing mold 10, to exhaust an air in the vessel 2 in the direction of an arrow A of FIG. 1 into a so-called medium vacuum to high vacuum, for example, into a vacuum in a range of from $10^{-1}$ to $10^{-5}$ Torr. The vessel lower portion 2-2 side in the vacuum processing bath 1 shown in FIG. 1 is fixed on a floor Fs by means of a plurality of columns 4 (only two pieces are shown in FIG. 1). A wheel conveyor 5 holds the mold 10 mounted on a level block 11.

The shower pipe 15 for a plasma flow, which has a cylindrical inner peripheral surface, is disposed in such a manner as to face to the inner peripheral surface of the mold 10 through a conduit tube 16. The shower pipe 15 is formed in a cylinder having a space $S_{15}$ inside the peripheral surface. A disk-like plasma flow introducing member 16-1 provided on the lower end of the conduit tube 16 is connected to the inner peripheral surface of the cylinder portion of the shower pipe 15. An inner space $S_{16-1}$ is thus connected to the space $S_{15}$ of the shower pipe 15. As shown in FIG. 2, a plurality of jetting holes 15h passing through the space $S_{15}$ are provided in the entire outer peripheral surface of the shower pipe 15. In the figure, these jetting holes 15h are arranged in a matrix; however, they may be arranged in a staggered manner in the vertical direction (in the extending direction of the conduit tube 16) or the lateral direction. The shower pipe 15 is preferably made of quartz or alumina.

The upper end portion of the conduit tube 16 is connected to a pipe 19 passing through a plasma generating furnace 18 by way of a connector 17. A microwave power having a frequency of 300 MHz to 30 GHz, preferably, 1 GHz to 10 GHz is supplied from a microwave power source 20 to the plasma generating furnace 18. A reactive gas flowing in the direction of an arrow B is converted into a plasma flow by discharge of the microwave power. At this time, the frequency, the supplied power value, and the flow rate (SCCM) of the reactive gas are selected such that the density of neutral active species becomes a specified value. Either a single oxygen gas, or a mixed gas of an oxygen gas as a main component and a halogenated gas, preferably $CF_4$ gas, is used as a reactive gas, to obtain oxygen (O, $O_2$, $O_3$) radicals or such oxygen radicals and a $CF_4$ radical. While one plasma generating furnace 18 is shown in FIG. 1, a plurality of the plasma generating furnaces 18 may be provided in parallel to the connector 17, and microwave powers are each supplied to the furnaces 18.

Figure 2:
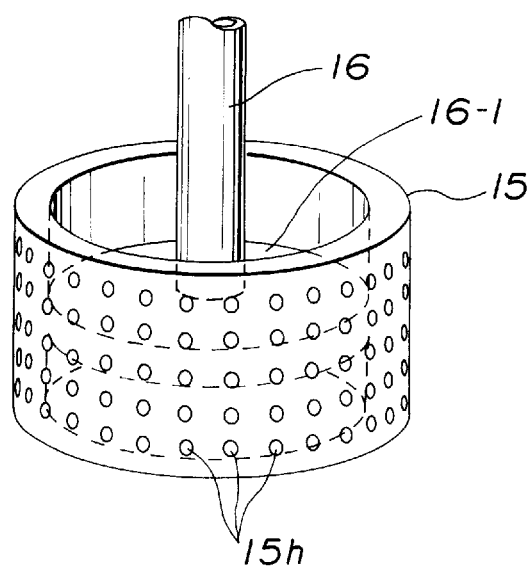
FIG. 2 is a perspective view of a shower pipe shown in FIG. 1.

A plasma flow generated in the plasma s generating furnace 18 is introduced to the space $S_{15}$ of the shower pipe 15 through the pipe 19, the connector 17, the conduit tube 16, and the introducing member 16-1 (see FIG. 2). The plasma flow thus introduced in the space $S_{15}$ is uniformly jetted through a plurality of the jetting holes 15h to the entire inner peripheral surface of the mold 10 in the direction of an arrow P. The reason why the plasma flow is uniformly jetted is that the vacuum pump is operated during a series of operations to continuously exhaust the gas in the vacuum processing bath 1 from the suction unit 3 for usually keeping the vacuum in the processing bath 1 at a constant value in the range of from 0.01 to 10 Torr.

In FIG. 1, reference numeral 12 indicates a temperature adjusting jacket as a heating source for heating the mold 10. A heating medium such as a high temperature gas or steam is supplied into an inner space $S_{12}$ of the jacket 12 for heating the mold 10 at a specified temperature in a range of from 100° to 180° C. The plasma ashing processing in the state that such a high temperature is kept allows the processing time to be significantly shortened. It is to be noted that while being not shown, the mold 10 includes a temperature measuring sensor, and a temperature and/or flow rate of the heating medium and also a temperature of the mold 10 are controlled on the basis of the measured result by a controller (not shown) provided outside the processing bath 1.

The mold 10 is shown in the form of one body; however, in this embodiment, a plurality (for example, 3 to 20 pieces) of segments of the outer peripheral side of a so-called split mold are temporarily assembled in the same state as in the practical use on the upper surface of a metal made (for example, steel made) carrying level block 11.

In addition, a portion of the mold 10 for forming a tread, various grooves and slits in a tread portion of a tire is generally made of an aluminum alloy. In practical molding, such an alloy portion is mounted on a steel holding member, which is taken as the above segment, and in the present invention, only the alloy portion and the segment composed of the alloy portion mounted on the holding member are both referred to as the mold 10.

In the case where the mold 10 is of a split mold type, a pair of side molds are assembled on the upper and lower sides of the segment mold shown in FIG. 1, to form a mold main body. Plasma cleaning can be carried out for such a mold main body taken as the mold 10. The present invention, however, can be also applied to a so-called two-divided mold having a division line on the circumference and to one of a plurality of segment molds. In the case of one segment mold, a residue adhering surface positioned upward is subjected to plasma cleaning using a shower tube 15 having a curved surface being substantially matched to the main curved surface of the residue adhering surface and provided with a plurality of jetting holes 15h directing to the residue adhering surface.

While being not shown, the level block 11 includes a mechanism for mounting a group of segments or a single mold at a specified position, which is used for temporarily assembling a plurality of segments, or mounting a split mold main body or a two-divided mold. The level block 11 also includes a mechanism for aligning the mold 10 composed of a group of segments or a single mold to the conduit tube 16. The aligning mechanism is aligned to and engaged with an aligning device provided on the wheel conveyor 5 for supporting the mold 10 and the level block 11.

The mold 10 is introduced into the processing bath 1 as follows. Namely, the vessel upper portion 2-1 is moved upward, and then the mold 10 previously temporarily assembled or mounted on the level block 11 outside the processing bath 1 is carried together with the level block 11 to a position shown in FIG. 1 by a wheel conveyor (not shown) similar to the wheel conveyor 5. At the same time, the mold 10 is aligned, that is, it is placed in such a manner that a center axis $Z_1$ of the inner peripheral surface of the mold 10 is exactly aligned to a center axis Z of the shower tube 15. The deviation in alignment between the center axes $Z_1$, and Z is preferably 3 cm or less, more preferably, 5 mm or less.

In the above-described method of the present invention, neutral active species in a plasma flow are uniformly jetted to elastomer residues adhering on the surface of the mold by repeated vulcanizing molding of elastomers, without exposure of the mold to a discharge area. This method, therefore, makes it possible to effectively and uniformly perform the ashing for residues for a short processing time, without damage of the mold, and without a limitation in size and shape of the mold formation surface of the mold.

Another method of the present invention will be described with reference FIGS. 3 to 5. In these figures, parts corresponding to those shown in FIGS. 1 and 2 are indicated by the same characters and the explanation thereof is omitted.

Figure 3:
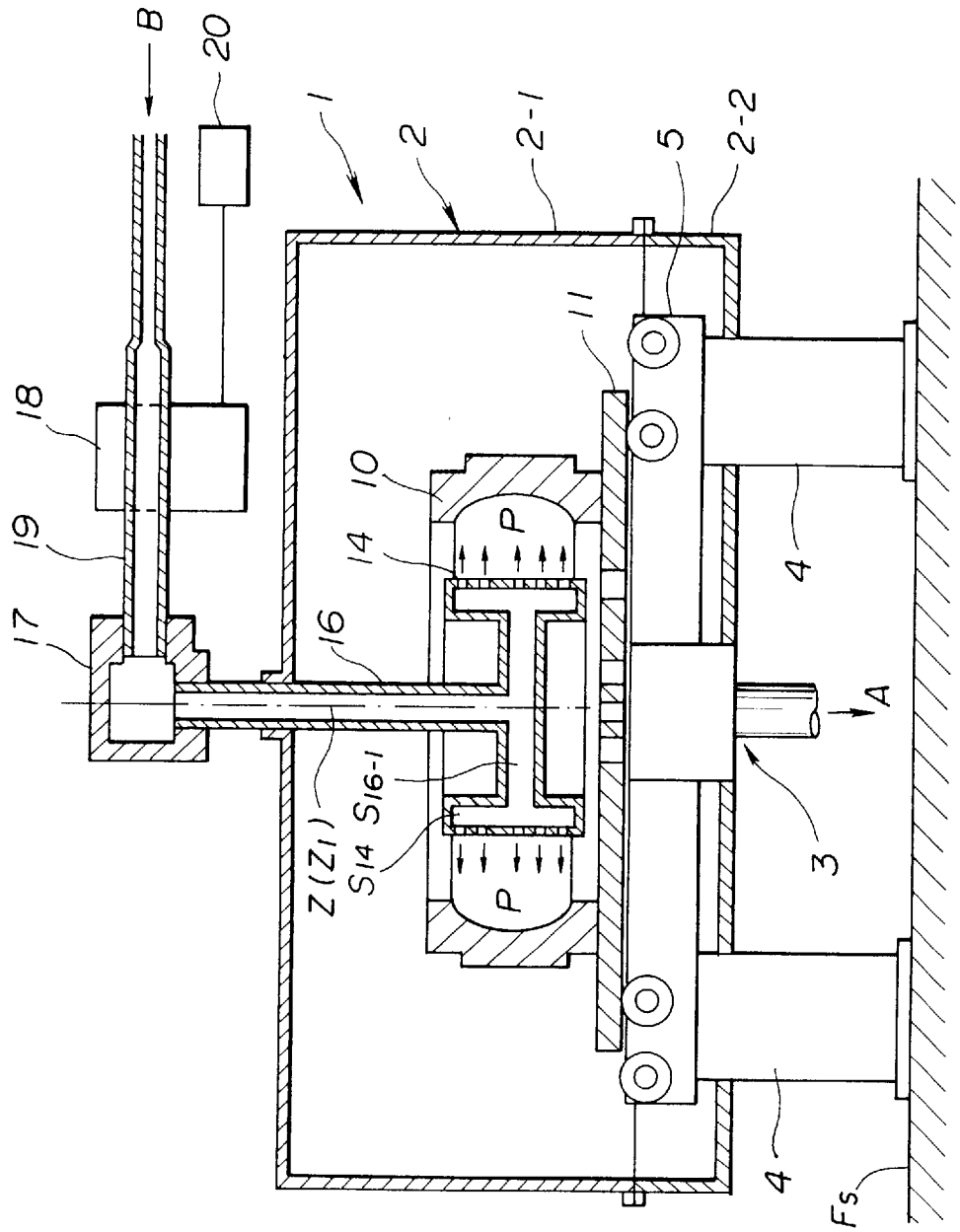
FIG. 3 is a sectional side view of another embodiment of the present invention, showing essential portions of a vacuum processing bath and a vulcanizing mold, with a plasma generating furnace schematically illustrated.
Figure 4:
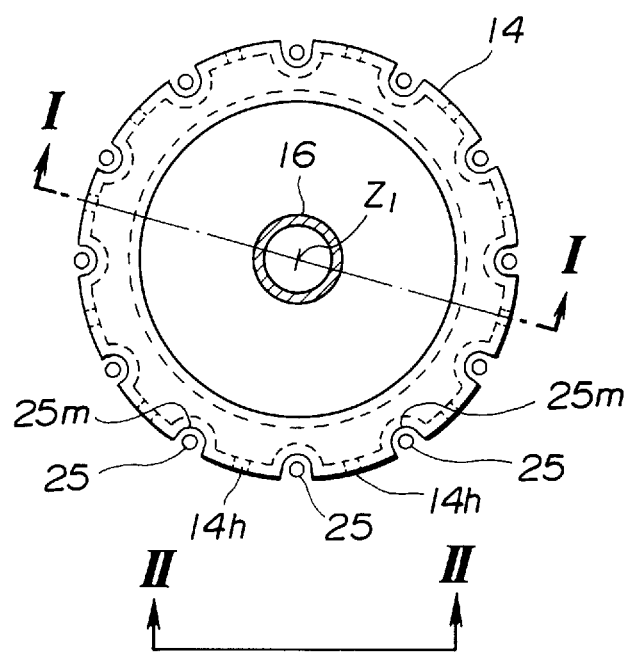
FIG. 4 is a plan view of one example of shower pipe shown in FIG. 3.
Figure 5:
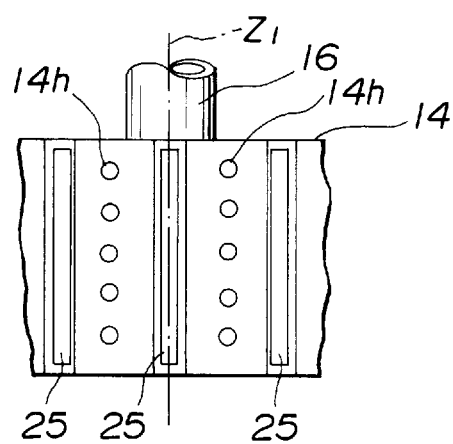
FIG. 5 is a partial side view of the shower pipe shown in FIG. 4.

As shown in FIGS. 3 to 5, a shower tube 14 for plasma flow is disposed at a position facing to the inner peripheral surface of a vulcanizing mold 10 through a conduit tube 16 and a disk-like plasma flow introducing member 16-1. The shower tube 14 has a plurality of recesses extending in the center axis Z on the cylindrical shaped outer peripheral surface. The shower tube 14 is formed in a cylindrical shape having a space $S_{14}$ inside the peripheral surface. The disk-like plasma flow introducing member 16-1 provided on the lower end of the conduit tube 16 is connected to the inner peripheral surface of the cylindrical portion of the shower tube 14. An inner space $S_{16-1}$ of the introducing member 16-1 is connected to the space $S_{14}$ of the shower tube 14. In addition, the cross-section of the shower tube taken on line I—I of FIG. 4 corresponds to that shown in FIG. 3.

As shown in FIGS. 4 and 5, heating sources, for example, infrared lamps 25 are disposed in a plurality of the recesses of the shower tube 14, and preferably, mirrors 25m reflecting infrared rays are disposed inside the lamps 25. A quantity of radiant heat generated by operation (turning on) of the lamp 25 per unit time can be controlled in association with the temperature of the inner peripheral surface of the mold 10 at a controller (not shown) disposed outside the processing bath 1. A temperature detecting means (not shown) for supplying data to such a temperature control is provided on the inner peripheral surface of the mold 10.

A plurality of jetting holes 14h passing through the space $S_{14}$, which are arranged in a column (along the center axis $Z_1$), are provided on the outer peripheral side of the shower tube 14 at positions held by the lamps 25. The jetting holes 14h are not necessarily arranged in a column as shown in the figure, but may be arranged in a staggered manner in the vertical or lateral direction, or may be arranged in a plurality of columns. The shower tube 14 is preferably made of quartz or alumina.

A plasma flow generated in the plasma generating furnace 18 is introduced to the space $S_{14}$ of the shower tube 14 through the pipe 19, the connector 17, the conduit tube 16, and the introducing member 16-1. The plasma flow thus introduced in the space $S_{14}$ is uniformly jetted to the entire inner peripheral surface of the mold 10 in the direction of an arrow P through a plurality of the jetting holes 14h. The reason why the plasma flow is uniformly jetted is that the vacuum pump is operated during a series of operations to continuously exhaust the gas in the vacuum processing bath 1 from a suction unit 3 for keeping the vacuum in the processing bath at a constant value in the range of from 0.01 to 10 Torr.

Before or at the same time when the plasma processing is started, the infrared lamps are operated to heat the inner peripheral surface of the mold 10 to be subjected to ashing at a specified temperature in a range of from 100° to 200° C. The plasma ashing processing in such a state that the high temperature is kept by the infrared lamps can significantly shorten the processing time. In addition, while being not shown, a temperature measuring sensor is provided on the inner peripheral surface of the mold 10 for controlling the temperature on the inner peripheral surface of the mold 1 by a controller (not shown) disposed outside the processing bath 1.

Figure 6:
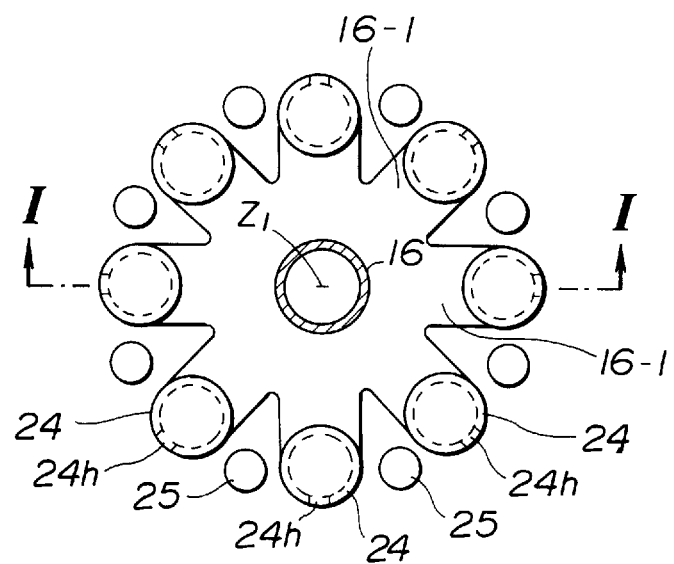
FIG. 6 is a plan view of another example of shower pipe shown in FIG. 3.
Figure 7:
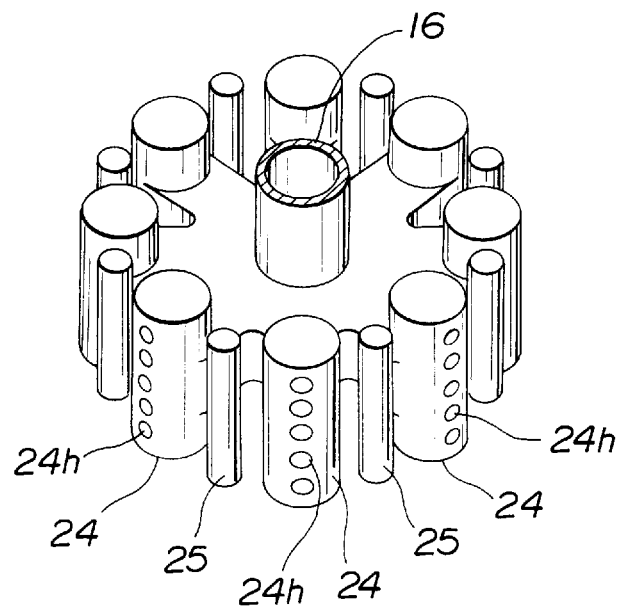
FIG. 7 is a perspective view of the shower pipe shown in FIG. 6.

Another example of shower tube and infrared lamp is shown in FIGS. 6 and 7. FIG. 6 is a plan view of shower tubes and infrared lamps and FIG. 7 is a perspective view of FIG. 6. As shown in these figures, a plurality (eight pieces in the figures) of shower tubes 24 vertically surround a conduit tube 16. The shower tube 24 is formed in a cylindrical shape having lids at both the ends. The shower tube 24 is connected to an introducing member 16-1 extending from the lower end portion of the conduit tube 16 and opened to the shower tube 24. The shower tube 24 has a plurality of jetting holes 24h on the side facing to the mold 10. Infrared lamps 25 are disposed between adjacent shower tubes 24. The jetting holes 24h are not necessarily arranged in a column as shown in the figure, but may be arranged in a staggered manner or in a plurality of columns. In addition, the cross-section of the shower tube taken on line I—I of FIG. 6 corresponds to that shown in FIG. 3, similarly to FIG. 4.

In the above-described method of the present invention, neutral active species in a plasma flow are uniformly jetted on elastomer residues adhering on the surface of the mold by repeated vulcanizing molding for elastomers without exposure of the mold to a discharge area, and at the same time the mold is uniformly heated by radiant heat. This method, therefore, makes it possible to effectively and uniformly perform the ashing process for residues for a short processing time, without damage to the mold, and without a limitation in size and shape of the mold formation surface of the mold, and further, to eliminate a waiting time between completion of ashing processing and water cleaning for ash content.

EXAMPLE

The present invention will be more fully understood with reference to the following examples.

Example 1

A mold 10 (maximum inside diameter: 550 mm) having eight pieces of segments was contained in a temperature adjusting jacket 12 on a level block 11, as shown in FIGS. 1 and 2. The mold 10 mounted on the level block 11 was placed in a vacuum processing bath 1. Vessels 2-1 and 2-2 were rigidly sealed, and a vacuum pump was operated to evacuate the inside of the processing bath 1 to a vacuum of $2 \times 10^{-3}$ Torr. A quartz made hollow cylinder having an outside diameter of 400 mm was used as a shower tube 15. A reactive gas composed of a mixed gas of $O_2$ gas and $CF_4$ gas was supplied at specified flow rates (1000 SCCM for $O_2$ gas, and 500 SCCM for $CF_4$ gas), and a plasma gas pressure in the processing bath was kept at 1.0 Torr. A microwave having a frequency of 2.45 GHz was applied to each of four plasma generating furnaces 18 connected in parallel, to generate a plasma discharge. A plasma flow mainly containing oxygen radicals was thus generated. The output of the microwave was 1.5 kW×4.

In this example, the jacket 12 was not operated, and thereby any temperature control for the mold 10 was not performed. In other words, the mold 10 was heated only by an energy of plasma. An ashing processing time was set at 120 minutes. The mold 10 at the end of processing was measured in terms of an average temperature and a difference (variation in temperature) between the maximum temperature and the minimum temperature. The mold 10 was also evaluated in terms of ashing performance, uniformity in ashing, abnormal discharge in processing, and cleaning degree. The ashing performance was classified into five grades by visual evaluation. It is to be noted that the ashing performance is enhanced in the order of from Grade 1 to Grade 5. The uniformity in ashing was evaluated in two grades (○: excellent, X: poor). The abnormal discharge during processing was evaluated by observation of the presence or absence of the abnormal discharge. The cleaning degree was classified in five grades by visual evaluation. It is to be noted that the observation for checking the cleaning degree is performed after removal of an ash content (an inorganic metal salt being little adhesive on a metal, such as $ZnSO_4$) from the processing surface by water washing after ashing.

The above abnormal discharge means a very bright spark discharge which is instantaneously generated during plasma discharge. Such abnormal discharge is possibly generated once or repeatedly by several times. In each case, the abnormal discharge is naturally returned to the usual plasma discharge, and it does not exert an effect on ashing of the mold 10 so mush. However, the checking of the molds shows that a pinhole and/or a square hollow (several mm×several mm) are sometimes formed in part of the mold after processing. Such a state of the mold 1 is also shown in Table 1 as a damage of the mold. It is to be noted that if large damage is generated, the damaged surface must be repaired, which takes excessive processing time.

Comparative Example 1 was made to verify the effect of Example 1. Ashing processing in Comparative Example 1 was made in the same manner as that described in the above-described documents by the present applicant, Japanese Patent Application Nos. Hei 7-19072, Hei 7-29158, and Hei 7-52480. Specifically, ashing processing in Comparative Example 1 was made in the same conditions as those in Example 1, except that an electrode composed of a cylindrical plate having a plurality of vertical fins was disposed in a mold 10 (ground side) as the other electrode at the center position (corresponding to that of the shower tube 15 in Example 1) and a plasma was generated by applying a power (6 kW) having a high frequency of 13.56 MHz between both the electrodes. The evaluated items and judgment methods in Comparative Example 1 were the same as those in Example 1. The processing was repeated by ten times in each of Example 1 and Comparative Example 1, and the measurement and evaluation were made for each processing. The results are shown in Table 1.

As is apparent from Table 1, the average temperature is higher and further a variation in temperature is significantly larger in Comparative Example 1, as compared with Example 1. This shows non-uniformity in plasma density distribution, that is, non-uniformity in ashing processing (see Processing Nos. 5, 7 and 10). Moreover, in Comparative Example 1, abnormal discharge is generated (see Processing Nos. 1, 5 and 6); and damage of the mold is generated (see Processing Nos. 1 and 6).

On the contrary, in Example 1, as is apparent from the fact that any abnormal discharge is not generated and further any damage of the mold 10 is not generated, the average temperature is in the range of about 80° C.; the variation in temperature is in a very narrow range negligible for practical use; the average ashing performance is substantially satisfactory (the ashing performance in Grade 4 is expected to be enhanced up to Grade 5 by extending the processing time somewhat); and the uniformity in ashing is excellent.

TABLE 1

| Processing Method | Processing No. | Average Temperature at the End (°C.) | Variation in Temperature (°C.) | Average Ashing Performance | Uniformity in Ashing | Abnormal Discharge | Damage of Mold |
|---|---|---|---|---|---|---|---|
| Comparative Example 1 | 1 | 180 | 15 | 5 | ○ | presence | presence |
|  | 2 | 165 | 12 | 5 | ○ | absence | absence |
|  | 3 | 175 | 16 | 4 | ○ | absence | absence |
|  | 4 | 160 | 22 | 4 | ○ | absence | absence |
|  | 5 | 130 | 58 | 3 | x | presence | absence |
|  | 6 | 180 | 15 | 5 | ○ | presence | presence |
|  | 7 | 175 | 48 | 3 | x | absence | absence |
|  | 8 | 180 | 13 | 5 | ○ | absence | absence |
|  | 9 | 135 | 15 | 4 | ○ | absence | absence |
|  | 10 | 150 | 38 | 3 | x | absence | absence |
| Inventive Example 1 | 1 | 80 | 5 | 4 | ○ | absence | absence |
|  | 2 | 75 | 4 | 4 | ○ | absence | absence |
|  | 3 | 85 | 4 | 4 | ○ | absence | absence |
|  | 4 | 85 | 5 | 4 | ○ | absence | absence |
|  | 5 | 80 | 3 | 4 | ○ | absence | absence |
|  | 6 | 75 | 4 | 4 | ○ | absence | absence |
|  | 7 | 80 | 4 | 4 | ○ | absence | absence |
|  | 8 | 85 | 5 | 4 | ○ | absence | absence |
|  | 9 | 80 | 4 | 5 | ○ | absence | absence |
|  | 10 | 85 | 3 | 4 | ○ | absence | absence |

Example 2

In this example, a mold 10 having the same size as that in Example 1 was heated by circulating steam in a space S12 of a jacket 12 as shown in FIGS. 1, 2, and the temperature of the mold 10 was controlled to be kept at 100° C. and 150° C. A shower tube 15 being the same as that in Example 1 was used. Vessel 2-1, 2-2 were rigidly sealed and the vacuum pump was operated to evacuated the inside of a processing bath 1 to a vacuum of $2\times10^{-3}$ Torr. Next, a reactive gas composed of a single $O_2$ gas was supplied in the processing bath 1 at a flow rate of 1000 SCCM, and a pressure of the plasma gas in the processing bath 1 was kept at 1.0 Torr. A microwave having a frequency of 2.45 GHz was applied to each of four plasma generating furnaces 18 connected in parallel, to generate a plasma flow mainly containing oxygen radicals. The output of the microwave was set at 1.5 kW×4.

Comparative Example 2 was made to verify the effect of Example 2. Ashing processing in Comparative Example 2 was made in the same conditions as those in Example 2, except that the heating of the mold 10 by the jacket 12 was not performed. The molds 10 in Example 2 and Comparative Example 2 were evaluated in terms of ashing performance and cleaning degree after an elapse of a specified time on the basis of the same criterion as that in Example 1. The results are shown in Table 2. In addition, the mold temperature described in Table 2 is a value at the end of processing expressed in Table 2.

As is apparent from Table 2, as compared with Comparative Example 2, the ashing performance and cleaning degree in Example 2 are excellent for the same processing time. This shows that each of the ashing performance and cleaning degree in Example 2 reaches the acceptance level, that is, Grade 4 or more for a short processing time such as about one hour.

TABLE 2

| Mold Temperature (°C.) | Processing Time (min.) | Ashing Performance | Cleaning Degree |
|---|---|---|---|
| 80 | 60 | 3 | 2 |
| (Comparative Example 2) | 120 | 4 | 4 |
|  | 180 | 4 | 4 |
| 100 | 30 | 3 | 2 |
| (Inventive Example 2) | 60 | 4 | 4 |
|  | 120 | 4 | 4 |
|  | 180 | 5 | 4 |
| 150 | 30 | 4 | 3 |
| (Inventive Example 2) | 60 | 4 | 4 |
|  | 120 | 5 | 4 |
|  | 180 | 5 | 5 |

Example 3

In this example, ashing processing was made in the same manner as in Example 2, except that a reactive gas composed of a mixed gas of $O_2$ gas and $CF_4$ gas was supplied in a plasma generating furnace 18 at specified flow rates (1000 SCCM for $O_2$ gas, and 500 SCCM for $CF_4$ gas); and the material of a shower tube 15 was changed from quartz to alumina for preventing the attack of decomposed halogen gas from $CF_4$ gas. Comparative Example 3 for verifying the effect of Example 3 was the same as Comparative Example 2. The results are shown in Table 3.

As is apparent from Table 3, Example 3 exhibits the same effect as that in Example 2. Namely, the ashing performance in Example 3 reaches the acceptance level, that is, Grade 4. Example 3 is different from Example 2 only in that the ashing performance is slightly enhanced by the effect of using $CF_4$ gas.

TABLE 3

| Mold Temperature (°C.) | Processing Time (min.) | Ashing Performance | Cleaning Degree |
|---|---|---|---|
| 80 | 60 | 4 | 3 |
| (Comparative Example 3) | 120 | 4 | 4 |
|  | 180 | 5 | 5 |

TABLE 3-continued

| Mold Temperature (°C.) | Processing Time (min.) | Ashing Performance | Cleaning Degree |
|---|---|---|---|
| 100 | 30 | 3 | 2 |
| (Inventive Example 3 | 60 | 5 | 4 |
|  | 120 | 5 | 5 |
|  | 180 | 5 | 5 |
| 150 | 30 | 4 | 3 |
| (Inventive Example 3) | 60 | 5 | 5 |
|  | 120 | 5 | 5 |
|  | 180 | 5 | 5 |

Example 4

A mold 10 (maximum inside diameter: 550 mm) having eight pieces of segments was assembled on a level block 11 as shown in FIGS. 3 to 5. The mold 10 thus assembled on the level block 11 was placed in a vacuum processing bath 1. Vessels 2-1 and 2-2 were rigidly sealed, and a vacuum pump was operated to evacuate the inside of the processing bath 1 to a vacuum of $2 \times 10^{-3}$ Torr. A quartz made hollow cylinder having an outside diameter of 400 mm was used as a shower tube 14. A reactive gas composed of a single $O_2$ gas was supplied at a flow rate of 1000 SCCM. A microwave having a frequency of 2.45 GHz was applied to four plasma generating furnaces 18 connected in parallel through a connector 17, to generate a plasma flow mainly containing oxygen radicals. The plasma flow was jetted to an inner peripheral surface (residue adhering surface) of the mold 10 through jetting holes 14$h$ of the shower tube 14. Next, the temperature of the inner peripheral surface of the mold 10 was increased by turning-on of infrared lamps 25. The output of the microwave was 1.5 kW×4, and the processing time was set at 120 minutes.

Comparative Examples 4A and 4B were made to verify the effect of Example 4. Ashing processing in each of Comparative Examples 4A and 4B was made in the same conditions as those in Example 4, except that a cylindrical electrode (outside diameter: 480 mm, height: 220 mm) having the center axis aligned to that of a mold 10 was disposed in the mold 10; a plasma was generated by applying a power (6 kW) having a high frequency of 13.56 MHz to the electrode and the mold 10; and the ashing was performed without heating by the infrared lamps 25. A difference between Comparative Examples 4A and 4B lies in whether or not fan cooling was applied after completion of processing.

The molds 10 in these examples were measured in terms of temperatures on the inner and outer peripheral surfaces directly after completion of processing, and visually evaluated in terms of ashing performance and cleaning degree by water washing. The classification of ashing performance and cleaning degree was the same as that in Example 1. The temperature on the outer peripheral surface of the mold 10 at the time of cleaning was also measured. The results are shown in Table 4.

TABLE 4

| | Generation Method of Plasma | Temperature at the End (°C.) | | Ashing Performance | Cooling Time (min.) | Temperature on Outer Peripheral Surface upon Cleaning (°C.) | Cleaning Degree |
| | | Inner Peripheral Surface | Outer Peripheral Surface | | | | |
|---|---|---|---|---|---|---|---|
| Comparative Example 4A | Direct Type | 180 | 180 | 5 | 0 | 170 | 1 |
| Comparative Example 4B | Direct Type | 180 | 180 | 5 | 90 | 50 | 5 |
| Inventive Example 4 | Indirect Type | 160 | 50 | 5 | 0 | 50 | 5 |

As is apparent from the cleaning degree shown in Table 4, each of Comparative Examples 4A and 4B necessarily requires a cooling process for obtaining a preferable cleaning degree. When water washing is performed at a high temperature without any cooling, the cleaning degree becomes Grade 1 (see Comparative Example 4A). In this case, a stain-like zinc compound is formed on the surface of the mold 10, and if unvulcanized tire is subjected to vulcanizing molding using such a mold 10, the irregularities of the residue are transferred on the surface of a tire product, to harm the appearance of the product, thereby significantly reducing the commercial value of the product. On the contrary, only the inner peripheral molding surface of the mold 10 is heated in Example 4, so that the temperature rise of the entire mold 10 having a very large heat capacity is retarded and consequently the temperature rise on the outer surface of the mold 10 is suppressed only to 50° C. in the condition described above. The mold 10 in Example 4 can be thus preferably washed by water without any waiting time from completion of ashing to cleaning.

Example 5

Examples 5A and 5B were made in the same conditions as those in Example 4, except that four kinds of processing time were selected. The mold 10 in each example was measured in terms of temperatures on the inner and outer peripheral surface of the mold 10 at the end of processing, and evaluated in terms of ashing performance, and cleaning degree in the case where cleaning was performed directly after completion of ashing. Comparative Example 5 was made in the same conditions as those in Examples 5A and 5B, except that lamps 25 were turned off. The classification of ashing and cleaning degree was the same as in Example 1. The results are shown in Table 5.

TABLE 5

| | Inner Peripheral Surface of Mold (°C.) | Outer Peripheral Surface of Mold (°C.) | Processing Time (min.) | Ashing Performance | Cleaning Degree |
|---|---|---|---|---|---|
| Comparative Example 5 | 45 | 45 | 30 | 2 | 1 |
| | 80 | 80 | 60 | 3 | 2 |
| | 80 | 80 | 120 | 4 | 2 |
| | 80 | 80 | 180 | 4 | 2 |
| Inventive Example 5A | 100 | 30 | 30 | 3 | 2 |
| | 100 | 30 | 60 | 4 | 4 |
| | 100 | 30 | 120 | 4 | 4 |
| | 100 | 30 | 180 | 5 | 4 |
| Inventive Example 5B | 200 | 50 | 30 | 4 | 3 |
| | 200 | 50 | 60 | 5 | 4 |
| | 200 | 50 | 120 | 5 | 5 |
| | 200 | 50 | 180 | 5 | 5 |

As is apparent from Table 5, the cleaning degree does not reach the acceptable level, that is, Grade 4 in Comparative Example 5 in which the infrared lamps 25 are turned off during processing. On the contrary, each of the ashing performance and cleaning degree in Examples 5A and 5B reaches the acceptance level for a processing time of 60 minutes. The use of radiant heat of the infrared lamps 25 in Examples 5A and 5B also allows the temperature rise of the entire mold 10 to be suppressed at such a level so as not to exert any adverse effect on the mold 10. In addition, the mold 10 in Examples 5A and 5B can be subjected to cleaning without any waiting time after ashing, like Example 4.

Example 6

This example is divided into Examples 6A and 6B, like Example 5. In these examples, ashing processing by plasma was made in the same conditions as those in Examples 4, 5A and 5B, except that shower tubes 24 each having jetting holes 24h as shown in FIGS. 6 and 7 were used; a reactive gas composed of a mixed gas of $O_2$ gas and $CF_4$ gas was supplied at specified flow rates (1000 SCCM for $O_2$ gas, and 500 SCCM for $CF_4$ gas) in a plasma generating furnace 18, and a plasma gas flow was generated by a microwave discharge in the furnace 18 and jetted through the jetting holes 24h; and the material of the shower tube 24 was changed from quartz to alumina for preventing the attack of decomposed halogen gas from the $CF_4$ gas. Comparative Example 6 was made in the same conditions as those in Examples 6A and 6B, except that infrared lamps 25 were turned off. The molds 10 in these examples were measured and evaluated in the same manner as in Example 5. The results are shown in Table 6.

TABLE 6

|  | Inner Peripheral Surface of Mold (°C.) | Outer Peripheral Surface of Mold (°C.) | Processing Time (min.) | Ashing Performance | Cleaning Degree |
|---|---|---|---|---|---|
| Comparative | 45 | 45 | 30 | 3 | 2 |
| Example 6 | 80 | 80 | 60 | 4 | 2 |
|  | 80 | 80 | 120 | 4 | 2 |
|  | 80 | 80 | 180 | 5 | 2 |
| Inventive | 100 | 30 | 30 | 3 | 2 |
| Example 6A | 100 | 30 | 60 | 5 | 4 |
|  | 100 | 30 | 120 | 5 | 5 |
|  | 100 | 30 | 180 | 5 | 5 |
| Inventive | 200 | 50 | 30 | 5 | 4 |
| Example 6B | 200 | 5Q | 60 | 5 | 5 |
|  | 200 | 50 | 120 | 5 | 5 |
|  | 200 | 50 | 180 | 5 | 5 |

As is apparent from Table 6, the cleaning degree does not reach the acceptance level, that is, Grade 4 in the above processing conditions in Comparative Example 6 in which the lamps 25 are turned off. On the contrary, each of the ashing performance and cleaning degree reaches the acceptance level for a processing time of about 60 minutes in Example 6A; while each of the ashing performance and cleaning degree reaches the acceptance level for a processing time of about 30 minutes in Example 6B. In addition, the temperature on the outer peripheral surface of the mold 10 is not high so much even in Inventive Example 6B (which is higher in temperature on the inner peripheral surface of the mold than that in Example 6A), so that the mold 10 after ashing can be subjected to cleaning without a waiting time.

While the preferred embodiments of the present invention have been described, such description is for illustrative purposes only, and it is to be understood that changes and variations may be made without departing from the spirit or scope of the following claims.

We claim:

1. In a method of cleaning a vulcanizing mold comprising the steps of:

positioning a vulcanizing mold in a vacuum processing bath;

applying a plasma of a low pressure reactive gas to an elastomer residue formed on an inner surface of said mold resulting from repeated vulcanizing molding of elastomers; and ashing and removing the elastomer residue, the improvement comprising the steps of:

providing a plasma generating furnace for supplying a plasma flow into said vacuum processing bath, and a microwave generating apparatus for converting a reactive gas flowing in said plasma generating furnace into a plasma flow mainly containing neutral active species by a microwave discharge, said reactive gas composed of either a single oxygen gas or a mixed gas of an oxygen gas as a main component and a halogenated gas;

introducing the plasma flow having mainly containing neutral active species which is generated in said plasma generating furnace, into said vacuum processing bath by way of a conduit tube;

uniformly jetting the introduced plasma flow to all of the elastomer residue adhering peripheral surface of said vulcanizing mold; and ashing the elastomer residue by the neutral active species contained in the jetted plasma flow wherein the ashing processing is carried out in a state that the residue adhering surface of said vulcanizing mold placed in said vacuum processing bath is heated and kept at a temperature in a range of from 100° to 200° C.

2. A method of cleaning a vulcanizing mold according to clam 1, wherein a heating source is provided facing to the residue adhering surface side of said vulcanizing mold; the temperature of the residue adhering surface heated due to a radiant heat supplied from said heating source is detected, and a quantity of the radiant heat supplied from said heating source is controlled on the basis of the detected temperature.

* * * * *